(12) United States Patent
Zhang et al.

(10) Patent No.: US 10,936,910 B2
(45) Date of Patent: Mar. 2, 2021

(54) SYSTEMS AND METHODS FOR JOINT ADVERSARIAL TRAINING BY INCORPORATING BOTH SPATIAL AND PIXEL ATTACKS

(71) Applicant: Baidu USA, LLC, Sunnyvale, CA (US)

(72) Inventors: Haichao Zhang, Sunnyvale, CA (US); Jianyu Wang, Santa Clara, CA (US)

(73) Assignee: Baidu USA LLC, Sunnyvale, CA (US)

( * ) Notice: Subject to any disclaimer, the term of this patent is extended or adjusted under 35 U.S.C. 154(b) by 115 days.

(21) Appl. No.: 16/399,078

(22) Filed: Apr. 30, 2019

(65) Prior Publication Data
US 2020/0265271 A1  Aug. 20, 2020

Related U.S. Application Data

(60) Provisional application No. 62/806,749, filed on Feb. 15, 2019.

(51) Int. Cl.
*G06K 9/62* (2006.01)
*G06N 20/00* (2019.01)

(52) U.S. Cl.
CPC ......... *G06K 9/6257* (2013.01); *G06K 9/6232* (2013.01); *G06N 20/00* (2019.01)

(58) Field of Classification Search
CPC .. G06K 9/6232; G06K 9/6257; G06K 9/6262; G06N 3/126; G06N 20/00
USPC ....................................................... 382/159
See application file for complete search history.

(56) References Cited

U.S. PATENT DOCUMENTS

2020/0242250 A1* 7/2020 Chen ..................... G06F 21/577

OTHER PUBLICATIONS

Tram'er et al., "Ensemble adversarial training: Attacks and defenses," arXiv preprint arXiv:1705.07204, 2018. (20 pgs).
Wang et al., "Bilateral adversarial training: Towardsfast training of more robust models against adversarial attacks," arXiv preprint arXiv:1811.10716 , 2019. (12pgs).
Xiao et al., "Spatially transformed adversarial examples," arXiv preprint arXiv:1801.02612, 2018. (29 pgs).
Xie et al., "Mitigating adversarial effects through randomization," arXiv preprint arXiv:1711.01991, 2018. (16 pgs).
Xie et al., "Feature denoising for improving adversarial robustness," arXiv preprint arXiv:1812.03411, 2019. (9pgs).
Zagoruyko et al., "Wide residual networks," arXiv preprint arXiv:1605.07146, 2016. (15 pgs).

(Continued)

*Primary Examiner* — Daniel G Mariam
(74) *Attorney, Agent, or Firm* — North Weber & Baugh LLP

(57) ABSTRACT

Described herein are embodiments for joint adversarial training methods that incorporate both spatial transformation-based and pixel-value based attacks for improving image model robustness. Embodiments of a spatial transformation-based attack with an explicit notion of budgets are disclosed and embodiments of a practical methodology for efficient spatial attack generation are also disclosed. Furthermore, both pixel and spatial attacks are integrated into embodiments of a generation model and the complementary strengths of each other are leveraged for improving the overall model robustness. Extensive experimental results on several benchmark datasets compared with state-of-the-art methods verified the effectiveness of the presented method.

20 Claims, 9 Drawing Sheets

(56) References Cited

OTHER PUBLICATIONS

Engstrom, "A rotation and a translation suffice: Fooling CNNs with simple transformations," arXiv preprint arXiv:1712.02779, 2018. (18pgs).
Zhang, "Non-uniform camera shake removal using a spatially-adaptive sparse penalty," In Advances in Neural Information Processing Systems, 2013. (9 pgs).
Jaderberg et al., "Spatial transformer networks," arXiv preprint arXiv:1506.02025, 2016. (15 pgs).
Koenderink et al., "The Structure of Locally Orderless Images," International Journal of Computer Vision, 31(2-3):159-168, 1999. (3 pgs).
A. Krizhevsky, "Learning Multiple Layers of Features from Tiny Images," Technical report, 2009. (60pgs).
Krizhevsky et al., "ImageNet Classification with Deep ConvolutionalNeural Networks," In Advances in Neural Information Processing Systems, 2012. (9 pgs).
Kurakin et al., "Adversarial machine learning at scale," arXiv preprint arXiv:1611.01236, 2017. (17 pgs).
Li et al., "Differentiable programming for image processing and deep learning in halide," ACM Trans, Graph., 37(4):139:1-139:13, Jul. 2018. (16pgs).
Liao et al., "Defense against adversarial attacks using high-level representation guided denoiser," arXiv preprint arXiv:1712.02976, 2018. (10pgs).
Liu et al., "Adversarial geometry and lighting using a differentiable renderer," arXiv preprint arXiv:1808.02651, 2018. (18pgs).
Liu et al., "Beyondpixelnorm-Balls:Parametricadversaries Using Ananalyticallydifferentiablerenderer," arXiv preprint arXiv:1808.02651, 2019. (21pgs).
Liu et al., "Towards Robust Neural Networks via RandomSelf-ensemble," arXiv preprint arXiv:1712.00673, 2018. (17pgs).
Athalye et al., "Obfuscated Gradients Give a False Sense of Security:Circumventing Defenses to Adversarial Examples," arXiv preprint arXiv:1802.00420, 2018. (12pgs).
Buesing et al., "Learning and Querying Fast Generative Models for Reinforcement Learning," arXiv preprint arXiv:1802.03006, 2018. (15pgs).
Carlini et al., "Towards evaluating the robustness of neural networks," arXiv preprint arXiv:1608.04644, 2017. (19 pgs).
Chen et al., "Reblur2Deblur: Deblurring Videos via Self-Supervised Learning," arXiv preprint arXiv:1801.05117, 2018. (8pgs).
Christmann et al., "On robustness properties of convex risk minimization methods for pattern recognition," Journal of Machine Learning Research, 5:1007-1034, 2004. (28pgs).
Dalvi et al., "Adversarial classification," In ACM SIGKDD International Conference on Knowledge Discovery and Data Mining, 2004. (10pgs).
Deng et al., "ImageNet: A Large-Scale Hierarchical Image Database," In Computer Vision and Pattern Recognition, 2009. (9pgs).
Engstrom et al., "A rotation and a translation suffice: Fooling CNNs with simple transformations," CoRR, 2017. (8pgs).
Goodfellow, et al., "Explaining and harnessing adversarial examples," arXiv preprint arXiv:1412.6572, 2015. (11 pgs).
Guo et al., "Countering adversarial images using input transformations," arXiv preprint arXiv:1711.00117, 2018. (12pgs).
Loper et al., "OpenDR: An approximate differentiable renderer," In European Conference on Computer Vision, 2014. (16 pgs).
Madry et al., "Towards deep learning models resistant to adversarial attacks," arXiv preprint arXiv:1706.06083, 2018. (27pgs).
Meng et al., "MagNet: a Two-Pronged Defense against Adversarial Examples," arXiv preprint arXiv:1705.09064, 2017. (13 pgs).
Metzen et al., "On Detecting Adversarial Perturbations," arXiv preprint arXiv: 1702.04267, 2017. (12 pgs).
Moosavi-Dezfooli et al., "Deepfool: a simple and accurate method to fool deep neural networks," arXiv preprint arXiv:1511.04599, 2016. (9 pgs).
Netzer et al., "Reading digits in natural images with unsupervised feature learning," In NIPS Workshop on Deep Learning and Unsupervised Feature Learning, 2011. (9pgs).
Prakash et al., "Deflecting adversarial attacks with pixel deflection," arXiv preprint arXiv:1801.08926, 2018. (17 pgs).
Samangouei et al., "Defense-GAN: Protecting classifiers against adversarial attacks using generative models," arXiv preprint arXiv:1805.06605, 2018. (17pgs).
Song et al., "Pixeldefend: Leveraging generative models to understand and defend against adversarial examples," arXiv preprint arXiv:1710.10766, 2018. (20pgs).
Szegedy et al., "Intriguing properties of neural networks," arXiv preprint arXiv: 1312.6199, 2014. (10 pgs).

\* cited by examiner

SYSTEMS AND METHODS FOR JOINT ADVERSARIAL TRAINING BY INCORPORATING BOTH SPATIAL AND PIXEL ATTACKS

CROSS-REFERENCE TO RELATED APPLICATION

This application claims the priority benefit under 35 USC § 119(e) to U.S. Prov. Pat. App. Ser. No. 62/806,749, filed on 15 Feb. 2019, entitled "JOINT ADVERSARIAL TRAINING: INCORPORATING BOTH SPATIAL AND PIXEL ATTACKS," and listing Haichao Zhang and Jianyu Wang as inventors. The aforementioned patent document is incorporated by reference herein in its entirety and for all purposes.

BACKGROUND

A. Technical Field

The present disclosure relates generally to systems and methods for adversarial training for image models. More particularly, the present disclosure relates to systems and methods for adversarial training by incorporating both spatial and pixel attacks.

B. Background

While progress has been made in image recognition leveraging deep neural networks, these image models might be easily fooled by the so-called adversarial examples. In terms of the image classification models, an adversarial example for a given image is a modified version that causes the classifier to produce a label different from the original one while being visually indistinguishable from it. Previous work mainly focused on improving the model robustness to pixel value perturbations. In contrast, very little work has been done on the model robustness with respect to spatial transformations. While it has been shown that certain spatial manipulations of images such as rotation and translation or non-rigid deformation may be used to generate adversarial examples for attacking purpose, no practical approach has been developed yet on how to incorporate the spatial domain into the adversarial training framework to further improve image model robustness.

Accordingly, what is needed are systems and methods for adversarial training by incorporating both spatial and pixel attacks to improve image model robustness.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
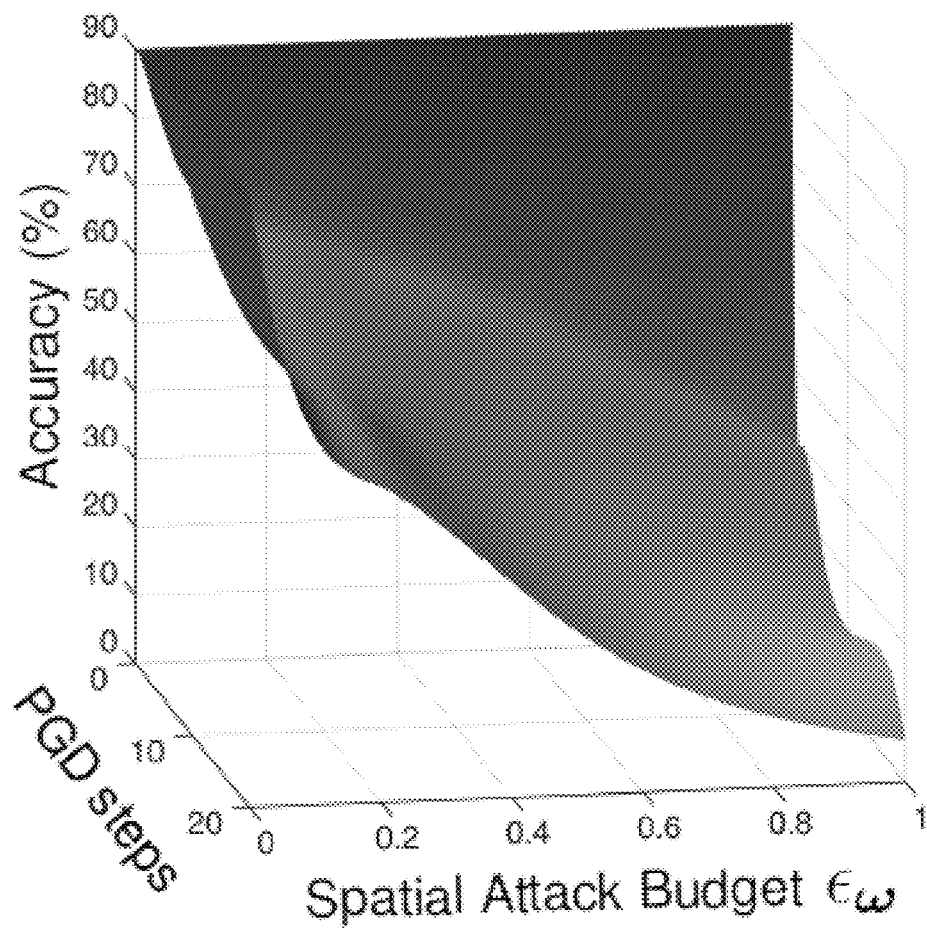
FIG. 1 depicts an accuracy of a prior art robust model under different spatial attack budgets $\epsilon_\omega$ using different number of projected gradient descent (PGD) steps.

In the following description, for purposes of explanation, specific details are set forth in order to provide an understanding of the present disclosure. It will be apparent, however, to one skilled in the art that embodiments may be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the present disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. An image may be a still image or from a video.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

While breakthroughs have been made in many fields such as image recognition leveraging deep neural networks, these models could be easily fooled by the adversarial examples. In terms of the image classification models, an adversarial example for a given image is a modified version that causes the classifier to produce a label different from the original one while being visually indistinguishable from it. Previous work mainly focused on improving the model robustness to pixel value perturbations. In contrast, very little work has been done on the model robustness with respect to spatial transformations with some initial investigation in a few recent works on adversarial attacks. While it has been shown that certain spatial manipulations of images, such as rotation and translation or non-rigid deformation, may be used to generate adversarial examples for attacking purpose, no practical approach has been developed yet on how to incorporate the spatial domain into the adversarial training framework to further improve the model robustness. Part of the reason lies in the fact that current works are mainly designed for attacking purpose, therefore the cost function and the optimization algorithm therein might not be proper for robust training. For example, grid search has been used for optimization of transformation parameters which is clearly limited to small parameter space and not scalable. Some proposed to generate adversarial examples by smoothly deforming a benign image using a flow field. For this purpose, the cost function incorporates a smoothness regularization term for the flow field to implicitly encourage the visual similarity. However, in order to get reasonably good solutions, more expensive solvers need to be used for minimizing the cost function. Moreover, the implicit penalty is not directly transferable to a quantifiable quantity representing the strength of the attack, which is desirable for performing quantitative evaluations of model robustness and benchmarking the performances of different algorithms. Described hereinafter, in embodiments, pixel attack refers to a conventional per-pixel additive attack and spatial attack refers to a spatial transformation-based attack.

In this patent document, embodiments of a joint spatial-pixel adversarial training approach are presented to improve image model robustness. The contributions of this patent document are at least threefold: (i) a spatial attack approach with explicit budgets and a practical first-order approach for spatial attack generation are presented. The disclosed setup may serve as one of the first benchmark for evaluating model robustness against spatial attacks; (ii) This patent document presents embodiments of a framework and concrete algorithms on how to jointly incorporate both pixel and spatial domains for joint adversarial generation; (iii) Embodiments of a joint adversarial training approach are developed to effectively leverage the joint attacks and improve the models robustness with respect to pixel, spatial, and joint attacks; and a first attempt is further presented to train a model embodiment that achieves state-of-the-art performance in terms of both pixel and spatial attacks.

B. Pixel Adversarial Training Embodiments

In a pixel-based adversarial training method, the training method may improve model robustness by solving the following minimax problem:

$$\min_{\theta} \{ \mathbb{E}_{(x,y) \sim \mathcal{D}} [\max_{\bar{x} \in S_x} \mathcal{L}(\bar{x}, y; \theta)] \} \quad (1)$$

where x and y denote the original image and label sampled from the dataset $\mathcal{D}$, $\bar{x}$ the adversarially perturbed image $\mathcal{L}(\cdot)$ the loss function, $\theta$ the network parameter, and $\epsilon_x$ the pixel perturbation budget. The feasible region $S_x$ may be defined as:

$$S_x = \{z | z \in B(x, \epsilon_x) \cap [-1,1]^n\}$$

Where images are scaled to have pixel values in [−1, 1], $B(x, \epsilon_x) = \{z | \|z-x\|_\infty \leq \epsilon_x\}$ denotes $\ell_\infty$-ball with center x and radius $\epsilon_x$. In the single sample point case, equation (1) may be reduced to:

$$\min_{\theta} [\max_{x' \in S_x} \mathcal{L}(x', y; \theta)]. \quad (2)$$

The inner maximization may be approximately solved by either a one-step approach such as the Fast Gradient Sign Method (FGSM), or a multi-step method such as the multi-step projected gradient descent (PGD) method with random starts:

$$x^0 \sim B(x, \epsilon_x) \quad (3)$$

$$x^{t+1} = \mathcal{P}_{S_x}(x^t + \alpha \cdot \text{sign}(\nabla_x \mathcal{L}(x^t, y; \theta))) \quad (4)$$

Where $\mathcal{P}_x(\cdot)$ is projection operator projecting the input into the feasible region $S_x$. In the PGD approach, the original image x is randomly perturbed to some point $x^0$ within $B(x, \epsilon_x)$ as shown in equation (3), and then goes through several PGD steps with a step size of $\alpha$ as shown in equation (4).

C. Model and Methodology Embodiments of Spatial Attacks

Most existing methods as reviewed in the previous section are trying to manipulate the pixel value directly and individually. While this ensures the most degrees of operational freedom, the resulting model is less robust in face of spatial attacks, possibly due to the challenges brought by the excessive degrees of freedom on finding the proper adversarial example for robust training. It has been shown that simple rotation and translation can be a form of naturally occurring adversarial attack. While it is argued that simple translational and rotational transformations are "semantic preserving" operations, the transformations are typically large enough to be noticeable. Some generate attacks by deforming a benign image with a flow-based non-rigid transformation and use a regularization term to encourage smooth deformation of the images. However, there is no direct constraints on the degrees of deformations applied, which makes it less straightforward to be connected with a quantifiable quantity representing the strength of the attack required for quantitative evaluation.

In this patent document, an alternative question is posed instead: can effective spatial attack with an explicit budget constraint be achieved such that the transformed images are visually indistinguishable from the original ones? In this patent document, a positive answer is given to this question and details are presented in the sections below.

1. Embodiments of Spatial Transformation-Based Attack Model

Given an original image $x \in \mathbb{R}^n$, a spatially transformed image may be represented as:

$$\tilde{x} = \mathcal{T}(x, \omega) \tag{5}$$

Where $\mathcal{T}: \mathbb{R}^n \times \mathbb{R}^{n \times 2} \to \mathbb{R}^n$ denotes a flow-parameterized warping operator with $\omega \in \mathbb{R}^{n \times 2}$ denotes the flow filed. In one or more embodiments, in order to use back-propagation for optimization, a differentiable warping is used. While the focus is on spatial transformation in this patent document, this notion of transformation is general and our work may potentially be generalized to other forms of transformations as well.

In one or more embodiments, for adversarial generation, the classification loss $\mathcal{L}$ is maximized similar to the pixel case, but with respect to the flow field:

$$\hat{\omega} = \max_{\omega \in S_\omega} \mathcal{L}(\mathcal{T}(x, \omega), y; \theta) \tag{6}$$

Then the spatial transformation-based adversarial attack may be generated as $\bar{x} = \mathcal{T}(x, \hat{\omega})$. Note that compared to equation (4), which modifies pixel values individually and directly, here images are modified through transformations thus impacting pixel values in an implicit way.

2. Embodiments of Explicit Budget for Spatial Attack

It is preferred to have a quantitative budget for easy benchmarking as in the pixel case, rather than indirect measurement such as total smoothness. Inspired by many seminal works in pixel case, where the change of pixel values are directly constrained, in one or more embodiments, the spatial attacks are budgeted in terms of the displacement amount. More specially, given a vector field to $\omega = [u, v] \in \mathbb{R}^{n \times 2}$, where $u \in \mathbb{R}^n$ and $v \in \mathbb{R}^n$ denote the horizontal and vertical components. In one or more embodiments, the flow $\omega$ is constrained with the spatial budget $\epsilon_\omega$-induced ball as:

$$\omega \in S_\omega \triangleq B(0, \epsilon_\omega) \triangleq \{\omega | \|\omega\|_{2,\infty} \leq \epsilon_\omega\} \tag{7}$$

$\|\cdot\|_{2,\infty}$ denotes the $\ell_{2,\infty}$-norm and is defined as follows for a general matrix $M \in \mathbb{R}^{n \times k}$:

$$\|M\|_{2,\infty} \triangleq \|[\|m_1\|_2, \|m_2\|_2, \ldots]^T\|_\infty, \quad 1 \leq i \leq n, \tag{8}$$

where $m_i$ denotes the i-th row of M. Intuitively speaking, equation (7) implies that the permissible flow field cannot have any flow vectors with a length that is larger than $\epsilon_\omega$. This notion of explicit budget is desired for measuring the robustness of different models, thus is one preferred prerequisite for designing algorithms on improving model robustness. The relationship of varying test time spatial budget and the accuracy of a robust model (Madry et al., Towards deep learning models resistant to adversarial attacks. In International Conference on Learning Representations, 2018) on CIFAR10 is depicted in FIG. 1. In one or more embodiments of the present document, it is empirically observed that setting $\epsilon_\omega$ to one percent the size of the image leads to a reasonable trade-off between visual quality and attack effectiveness. For CIFAR images of size 32×32, this implies $\epsilon_\omega = 0.3$.

3. Embodiments of Generalized Gradient Sign Method

Toward the goal of robust training, an efficient algorithm is preferred for solving equation (6) before it may be integrated into adversarial training. Some solutions such as grid search or Limited-memory Broyden-Fletcher-Goldfarb-Shanno (L-BFGS) method are either less scalable or too expensive thus are less appropriate for adversarial training. More specifically, the non-parametric form of $\omega$ renders the grid search method impractical. A goal of incorporating the generation into training pipeline in one or more embodiments of this patent document also favors less on more expensive methods. Along this line of reasoning, in one or more embodiments, a first-order method is used to solve equation (6):

$$\omega^{t+1} = \omega^t + \alpha \cdot \nabla_\omega \mathcal{L}(\mathcal{T}(x, \omega), y; \theta) \tag{9}$$

However, to be efficient and effective, both FGSM and PGD methods should incorporate the sign(•) operator for efficiency in pixel attack. Here for spatial attack, a similar mechanism may be used. In one or more embodiments, by viewing sign(•) as a scalar normalization function, i.e., $$\text{sign}(x) = \frac{x}{\|x\|},$$

a "generalized sign" operator for vectors may be defined as:

$$\overrightarrow{\text{sign}}([u, v]) = \frac{[u, v]}{\sqrt{u^2 + v^2}} \tag{10}$$

When $\overrightarrow{\text{sign}}(\bullet)$ takes a flow field $\omega$ as input, it operates on each row vector separately. While the scalar sign(•) in the pixel case normalized the scalar value and keeps the sign, the vector $\overrightarrow{\text{sign}}(\bullet)$ normalized the vectors while retaining their original directions.

Figure 2:
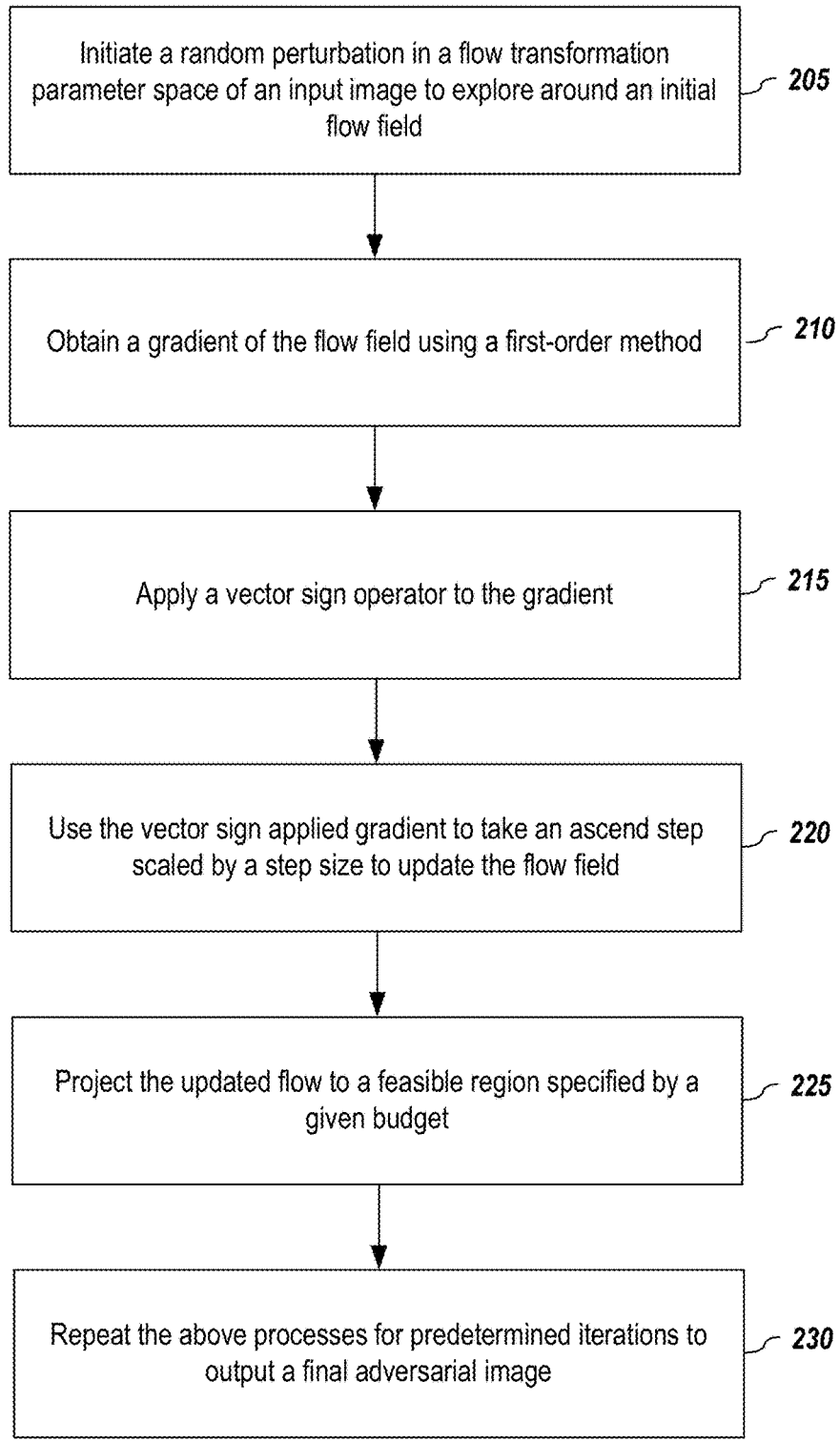
FIG. 2 depicts a generalized gradient sign method for robust training, according to embodiments of the present disclosure.

FIG. 2 depicts processes to complete a generalized gradient sign method for robust training, according to one or more embodiments of the present disclosure. Firstly, for spatial perturbation, the processes start with a random perturbation (205) in the flow transformation parameter space similar to the pixel case in order to better explore the $\epsilon_\omega$-ball around an initial flow field. In one or more embodiments, the initial flow field is all-zero. After obtaining (210) a gradient of the flow field using a first-order method shown in equation (9), the vector sign operator $\overrightarrow{\text{sign}}(\bullet)$ is applied (215) to the gradient, and then the vector sign applied gradient is used to take (220) an ascent step scaled by a step size $\alpha$ for updating the flow field. The flow updated with the gradient is then projected (225) to a feasible region $S_\omega$ specified by the given budget $\epsilon_\omega$. The above processes may be repeated (230) for predetermined steps or iterations to output a final adversarial image. The full procedure embodiments is summarized in Methodology 1. In one or more embodiments, in the case of multi-step PGD, it is preferred to accumulate the changes in the transformation parameter ω using the original image x as shown in Methodology 1, rather than applying transformations to a resulting image accumulatively, which will lead to distorted blurry results due to accumulated transformation error.

---

Methodology 1: Generalized Gradient Sign Method Embodiments

Input: image x, flow ω, loss $\mathcal{L}$, step m, budget $\epsilon_\omega$
Initiate $\omega^0 \sim B(0, \epsilon_\omega)$
for t = 1 to m do
    $\bar{x} = \mathcal{T}(x, \omega^{t-1})$
    $\overrightarrow{\omega'^t} = \omega^{t-1} + \alpha \cdot \overrightarrow{\text{sign}}(\nabla_\omega \mathcal{L}(\bar{x}, y; \theta))$
    $\omega^t = \mathcal{P}_{S_\omega}(\omega'^t)$
end for
Output: adversarial image $\mathcal{T}(x, \omega^m)$.

---

4. The Effectiveness of First-Order Spatial Attack Embodiments

Although the spatial attacks have much less degrees of freedom, it may attack a model trained with clean images effectively with a high success rate (c.f. Table 1). Moreover, it may also attack a pixel robustified models with high success rate. For example, it may reduce the performance of a robust model trained with a state-of-the-art method effectively as shown in FIG. 1. It is observed from FIG. 1 that even at a very low budget range (e.g. $\epsilon_\omega \leq 0.5$), the first-order attack may significantly reduce the accuracy rate of a pixel-robustified model while maintaining a high resemblance of the original image. Although this degree of resemblance decreases when moving towards the high budget region (e.g. $\epsilon_\omega \to 1$) as there is no explicit smoothness penalty over the flow field the perturbed images still preserve the global structure thus the major information. Furthermore, it is observed that under a fixed budget, embodiments of the presented method may reduce the accuracy of the robustified model significantly after a single step and the attacking strength increases with increased number of PDG steps.

In summary, the effectiveness of the presented first-order approach embodiments for generating spatial attacks is observed empirically. Different from the observations in Engstrom et al. (*A rotation and a translation suffice: Fooling CNNs with simple transformations*, CoRR, abs/1712.02779, 2017), it is found that the first-order optimization method is fairly effective in generating adversarial spatial attacks. This enables further utilizing the method for adversarial model training as detailed in the next section.

D. Embodiments of Joint Spatial-Pixel (Joint-SP) Adversarial Training

In order to jointly incorporate both spatial and adversarial perturbations, a re-parameterization of the adversarial image in the pixel attack case is first presented as follows:

$$\bar{x} = x + \delta \tag{11}$$

Based on this re-parameterization, the optimization may be conventionally switched from optimizing over $\bar{x}$ as in equation (1) to optimizing over pixel-wise perturbation δ. While this may be insignificant when considering pixel attacks only, it facilities derivation in the presence of multiple attacks. Concretely, when incorporating both spatial and pixel transformations, the following model for joint spatial-pixel adversarial attack generation is used in one or more embodiments:

$$\bar{x} = \mathcal{T}(x, \omega) + \delta \tag{12}$$

Figure 3:
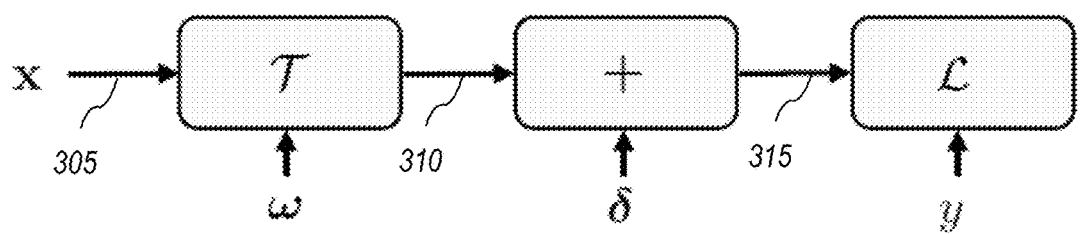
FIG. 3 depicts a computational graph for Joint Spatial-Pixel (Joint-SP) adversarial attack and training, according to embodiments of the present disclosure.

FIG. 3 depicts a computational graph for Joint Spatial-Pixel adversarial attack and training, according to embodiments of the present disclosure. $\mathcal{T}$ denotes the spatial transformation operator to perform spatial transformation for the input image 305. + corresponds to pixel-wise additive attacks to the spatial transformed image 310. For generating joint adversarial attacks, the optimization is over ω and δ, instead of over x directly. The optimized ω and δ are then used to generate the perturbed image 315. Based on this, the adversarial image may be generated by optimizing over both ω and δ through a proper loss function $\mathcal{L}$. Given equation (12), the formulation for the joint adversarial training task may be described as follows:

$$\min_\theta [\max_{\omega \in S_\omega, \delta \in S_\delta} \mathcal{L}(\mathcal{T}(x, \omega) + \delta, y; \theta)] \tag{13}$$

In one or more embodiments, the feasible region $S_\delta$ is defined as:

$$S_\delta = \{\delta | \delta + \mathcal{T}(x, \omega) \in B^{\mathcal{T}}(x, \epsilon_x) \cap [-1, 1]^n\} \tag{14}$$

Where $B^{\mathcal{T}}(x, \epsilon_x) = \{z | \|z - \mathcal{T}(x, \omega)\|_\infty \leq \epsilon_x\}$, which essentially means the element z is in the ball when it is close to the transformed clean image $\mathcal{T}(x, \omega)$ in terms of $\ell_\infty$-norm. The adversarial example is generated by solving the inner problem of equation (13) optimizing over both ω and δ. An embodiment of a practical methodology is presented in the sequel below.

1. Embodiments of Joint Attack Via Double-Pass Methodology

Figure 4:
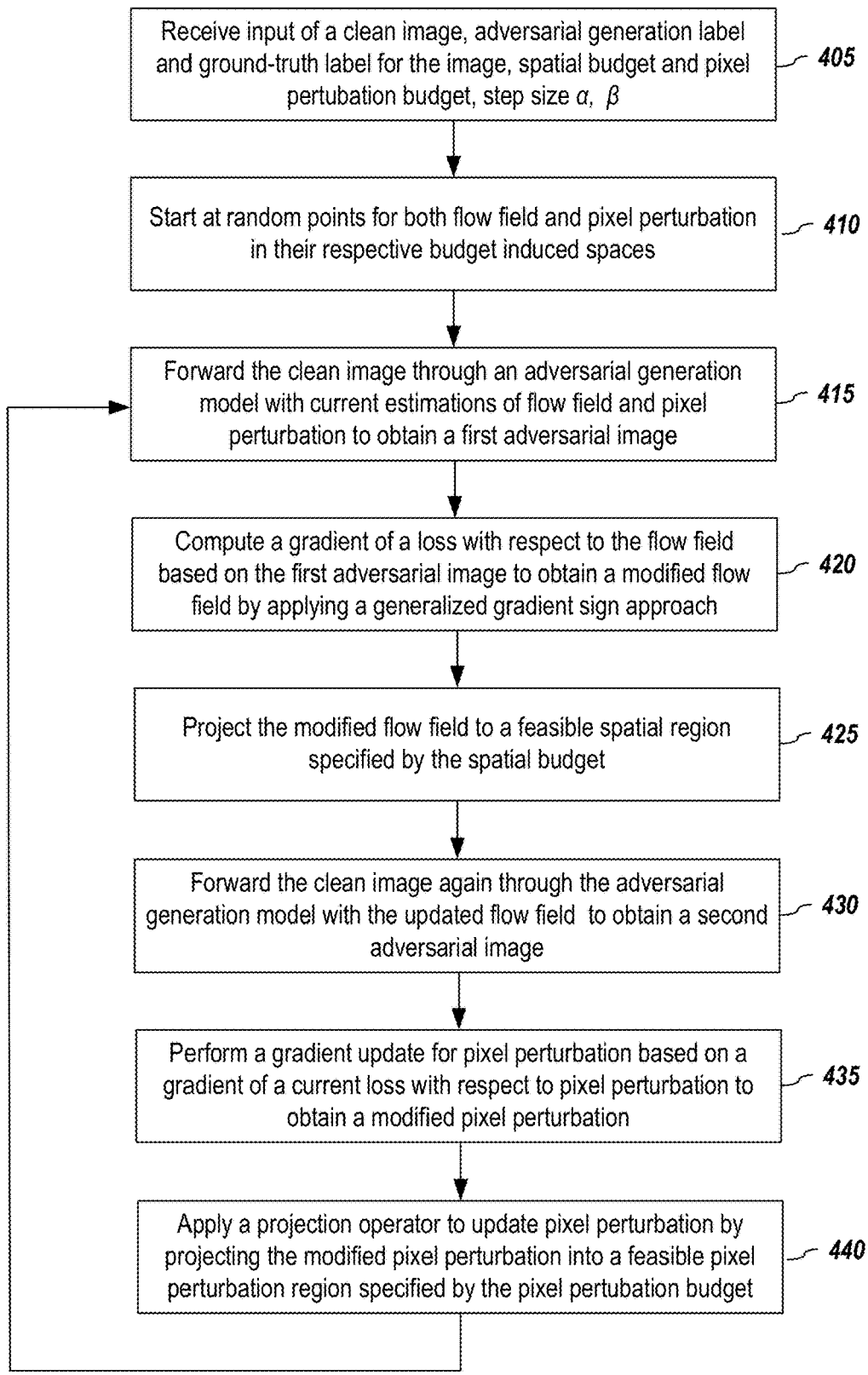
FIG. 4 depicts a double-pass methodology to handle interactions in Joint-SP attacks, according to embodiments of the present disclosure.

In one or more embodiments, to solve for the inner maximization problem of equation (13), a double-pass methodology is presented, as shown in FIG. 4, for properly handling the interactions between the two types of attacks. Detailed processes for joint spatial-pixel adversarial attack generation is summarized in Methodology 2. A clean image x, adversarial generation label y and ground-truth label $y_{gt}$ for the image x, spatial budget $\epsilon_\omega$, pixel perturbation budget $\epsilon_x$, spatial step size α, and pixel step size β are received (405) as input. In one or more embodiments, the adversarial generation label y is randomly sampled from a label group excluding the ground-truth label $y_{gt}$. The method starts (410) at random points for both flow field ω and pixel perturbation δ in their respective ε-balls or budget induced spaces. In one or more embodiments, a determination process for an ascend/descend flag s is incorporated in the initiation step 410. The ascend/descend flag is set as −1 when the adversarial generation label y does not equal to the ground-truth label $y_{gt}$, and set as 1 otherwise. In a first pass, the clean image x is forwarded (415) through the adversarial generation model shown in equation (12) with current estimations of ω and δ to obtain a first adversarial image $\bar{x}$. Then, the gradient of the loss with respect to ω is computed (420) based on $\bar{x}$ to obtain a modified flow field $\bar{\omega}$ based on at least the computed gradient $\nabla_\omega \mathcal{L}(\bar{x}, y; \theta)$ and the ascend/descend flag s. In one or more embodiments, a generalized gradient sign approach (Methodology 1) is applied, by applying the vector sign operator $\overrightarrow{\text{sign}}(\cdot)$ to the gradient $\nabla_\omega \mathcal{L}(\overline{x}, y; \theta)$, and then the vector sign applied gradient is used to take an ascend or descend step determined by the ascend/descend flag s and scaled by a steps size α to obtain the modified flow field $\overline{\omega}$. The modified flow field $\overline{\omega}$ is projected (425) to a flow feasible region $S_\omega$ specified by the spatial budget $\epsilon_\omega$. In the second pass, the clean image is forwarded (430) again through the adversarial generation model with the updated ω to obtain a second adversarial image $\overline{x}'$ and perform (435) a gradient update for δ based on the gradient of the current loss $\mathcal{L}(\overline{x}', y; \theta)$ (a loss function of at least the second adversarial image $\overline{x}'$) with respect to δ to obtain a modified pixel perturbation $\overline{\delta}$. In one or more embodiments, the vector sign operator $\overrightarrow{\text{sign}}(\cdot)$ to the gradient $\nabla_\delta \mathcal{L}(\overline{x}', y; \theta)$ is applied, and then the vector sign applied gradient is used to take an ascend or descend step determined by the ascend/descend flag s and scaled by a steps size β to obtain the modified pixel perturbation $\overline{\delta}$. A projection operator under a projected gradient descent (PGD) approach is then applied (440) to update δ by projecting the modified pixel perturbation $\overline{\delta}$ into a pixel perturbation feasible region $S_\delta$ specified by the pixel perturbation budget ex. Processes 415~440 may be repeated for multiple (m) iterations to generate a final adversarial image. The whole process may be essentially viewed as a variant of the alternating minimization approach at instance level. The final adversarial image is generated as $\mathcal{T}(x, \omega^m) + \delta^m$, where m denotes number of steps.

---

Methodology 2 Double-Pass
Joint Adversarial Attack Embodiments

---

Input: image x, adversarial generation label y,
ground-truth label $y_{gt}$, loss $\mathcal{L}$, step m,
budget $\epsilon_\omega$, $\epsilon_x$, step size α, β
Initiate $\omega^0 \sim B(0, \epsilon_\omega)$, $\delta^0 \sim B(0, \epsilon_x)$,
Determine the ascend/descend flags $$s = \begin{cases} -1, & y \neq y_{gt} \\ 1, & \text{else} \end{cases}$$

for t = 1 to m do
  $\overline{x} = \mathcal{T}(x, \omega^{t-1}) + \delta^{t-1}$ //first-pass
  $\overline{\omega} = \mathcal{T}(x, \omega^{t-1}) + \alpha \cdot s \cdot \overrightarrow{\text{sign}}(\nabla_\omega \mathcal{L}(\overline{x}, y; \theta))$
  $\omega^t = \mathcal{P}_{S_\omega}(\overline{\omega})$
  $\overline{x}' = \mathcal{T}(x, \omega^t) + \delta^{t-1}$ //second-pass
  $\overline{\delta} = \delta^{t-1} + \beta \cdot s \cdot \text{sign}(\nabla_\delta \mathcal{L}(\overline{x}, y; \theta))$
  $\delta^t = \mathcal{P}_{S_\delta}(\overline{\delta})$
end for
Output: adversarial image $\mathcal{T}(x, \omega^m) + \delta^m$.

2. Embodiments of Practical Joint Adversarial Training

In one or more embodiments, training robust models that are resistant to both spatial and pixel attacks boils down to solving a minimax problem as in equation (13). In one or more embodiments, equation (13) may be solved approximately by replacing the original clean training images with the joint adversarially perturbed images obtained through the inner problem, and then performing a conventional training of the model using the perturbed images as done in conventional adversarial training.

Figure 5:
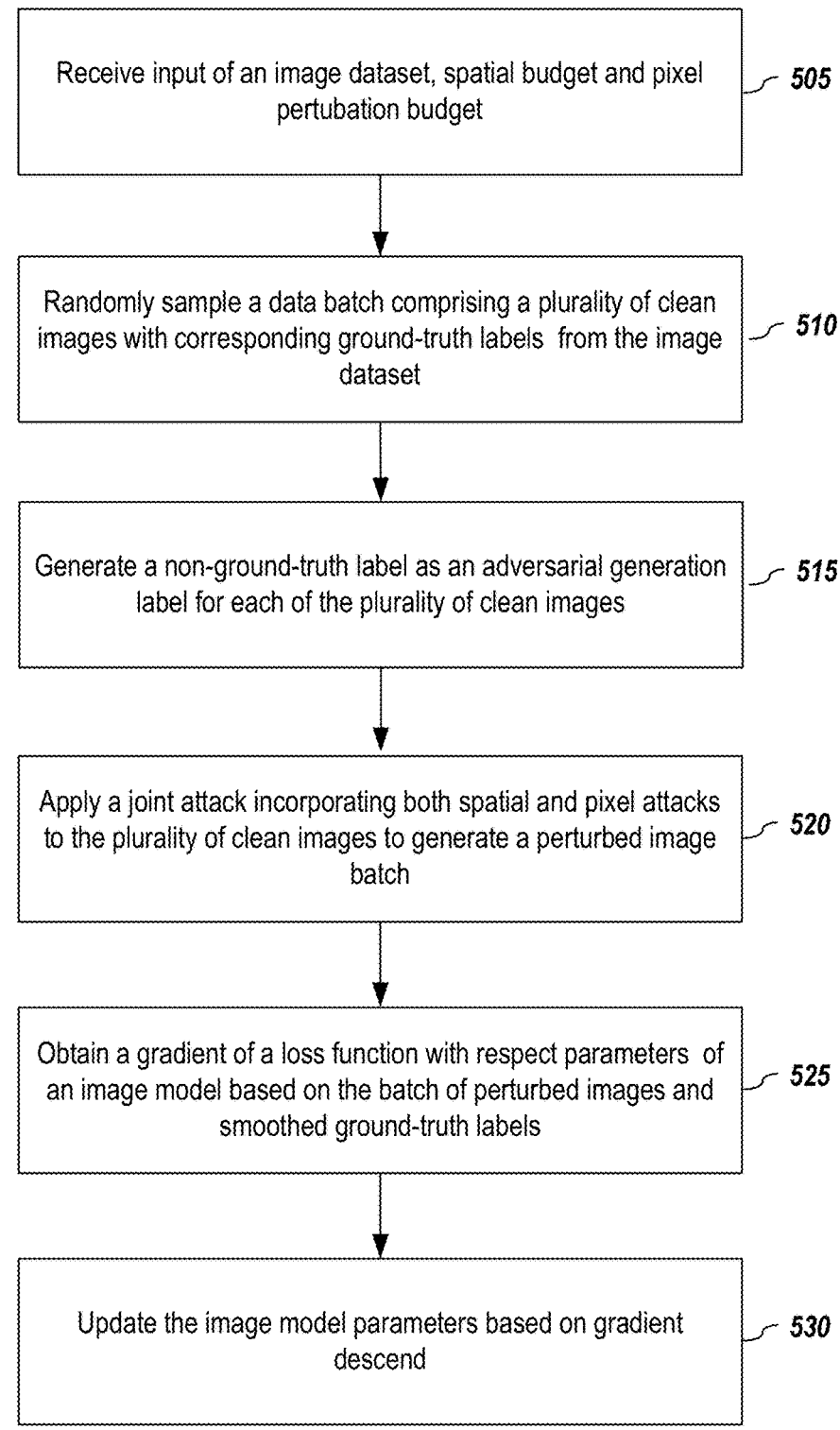
FIG. 5 depicts a method of joint adversarial training for an image model, according to embodiments of the present disclosure.

The inner optimization problem corresponds to the attack side and embodiments of a first-order approach for joint attack generation have been presented in Section D.1 and summarized in Methodology 2. FIG. 5 depicts a method of joint adversarial training for an image model, according to one or more embodiments of the present disclosure. In practice, a targeted approach may be used for generating the adversarial images. An image dataset $\mathcal{D}$, spatial budget $\epsilon_\omega$, pixel perturbation budget $\epsilon_x$ are received (505) as input. A data batch comprising a plurality of clean images $x_i$ with corresponding ground-truth labels $y_i$ are randomly sampled (510) from the dataset $\mathcal{D}$. For each clean image in the batch, a non-ground-truth label is generated (515) as an adversarial generation label $\hat{y}_i$. In one or more embodiments, the non-ground-truth label is generated by replacing the ground-truth label $y_i$ with another label randomly sampled from the rest (a uniform distribution) excluding the correct one as $\hat{y}_i = \text{rand\_unif}(\{0, 1, \ldots\} \setminus \{y_i\})$. A joint attack incorporating both spatial and pixel attacks is applied (520) to the batch to generate an adversarial image batch comprising multiple adversarial images according to Methodology 2 using targeted method with targets $\hat{y}_i$. A gradient of a loss function with respect to parameters θ of the image model is then obtained (525) based on the batch of adversarial images and smoothed ground-truth labels $\overline{y}_i$. In one or more embodiments, the smoothed ground-truth labels $\overline{y}_i$ may be obtained by $\overline{y}_i = \text{label\_smooth}(y_i)$, with detailed shown in Section G. The image model parameters θ are updated based on gradient descend. In other words, the gradient is used for a descent step, instead of an ascent step, scaled by the learning rate γ for updating the model parameters θ. In one or more embodiments, the descent step is the average of the gradients for each adversarial image scaled by the learning rate γ. The above steps 510~530 may be repeated for predetermined iterations before the joint adversarial training process ends. In one or more embodiments, for the final training, a label smoothing technique may be used. The complete procedure for joint adversarial training is summarized in Methodology 3.

---

Methodology 3 Joint Adversarial Training Embodiments

---

Input: Dataset $\mathcal{D}$, budget $\epsilon_\omega$, $\epsilon_x$, training epochs K, batch size S, learning rate γ
for k = 1 to K do
  for $\{x_i, y_i\}_{i=1}^S$ from first to last random batch $\sim \mathcal{D}$ do
    generate jointly perturbed image batch $\{\overline{x}_i\}_{i=1}^S$ according to Methodology 2 using targeted method with
    targets $\hat{y}_i = \text{rand\_unif}(\{0, 1, \ldots\} \setminus \{y_i\})$
    get $\{\overline{y}_i\}$ with $\overline{y}_i = \text{label\_smooth}(y_i)$ as detailed in Section G $$\theta = \theta - \gamma \cdot \left( \nabla_\theta \frac{1}{S} \sum_{i=1}^S \mathcal{L}(\overline{x}_i, \overline{y}_i; \theta) \right)$$

end for
end for
Output: model parameter θ.

---

It is empirically observed that the joint attack is a type of attack that is stronger than either pure pixel or spatial attacks, as shown in Tables 1~7. It may be observed that the pixel robustified models are still vulnerable to spatial attacks. This seems to suggest that these two types attacks are not entirely in the same space, thus offering complementary strength to some extent. This is in line with the observation of Engstrom et al. (*A rotation and a translation suffice: Fooling CNNs with simple transformations*, CoRR, abs/1712.02779, 2017). On the other hand, jointly considering both forms of attacks may further improve the robustness of the model compared with that of the model trained with only one type of attacks. This seems to suggest that the two forms of attacks share part of a common space where they can interact, which is different from the observation that they are orthogonal to each other in Engstrom et al. This observation is reasonable and is aligned with the fact that both are eventually impacting the pixel values, thus indeed sharing some common operational ground. It is worthwhile to explain a few points about the proposed double-pass algorithm. Firstly, it is different from simply performing pixel adversarial after spatial perturbation as two isolated pieces. Secondly, the straightforward one-pass approach does not perform well potentially due to the reason that it cannot handle the conflict of two types of attacks properly. More discussions on these points, including the order of the two types of attacks, are elaborated in the experiment section.

E. Some Discussions

In this section, the relationship of embodiments of the presented joint attack approach with some previous related works are presented to help in understanding the connections with the literature.

Pixel Adversarial Attacks and Defenses.

Adversarial examples have been investigated under different contexts. Some pointed out that CNNs are vulnerable to adversarial examples and some else proposed the fast gradient sign method (FGSM) for adversarial attack generation. Many variants of attacks have been developed later. In the meantime, many efforts have been devoted to defend against adversarial examples. Recently, some showed that many existing defense methods suffer from a false sense of robustness against adversarial attacks due to gradient masking. Currently, adversarial training may be the best defense method against adversarial attacks. It formulates the task of robust training as a minimax problem, where the inner maximization essentially generates attacks while the outer minimization corresponds to minimizing the "adversarial loss" induced by the inner attacks. Some recently introduce a label adversarial procedure for adversarial training which achieves state-of-the-art performances with a single-step method.

Spatial Transformation and Adversarial Attacks.

Spatial transformation has been playing a crucial role in training deep network models. It has been commonly used for augmenting the training data for training deep networks. The spatial transformer network has been used to further improve the invariance of the model with respect to spatial transformations of input images. A few recent works investigated the role of spatial transformation in attacks. Some showed that simple rotation and translation may perform attack effectively. Some else used a flow field to deform a benign image smoothly to generate attacks. In the present disclosure, a flow field is also used for spatial transformation. But instead of implicitly penalize for the flow field, the flow is explicitly constrained with a budget in one or more embodiments of the present disclosure. Furthermore, embodiments of a practical first-order approach are developed for efficient adversarial generation, which is more practical compared to grid search or L-BFGS. All together these efforts enable a goal of joint adversarial training in this patent disclosure.

Differentiable Renderer.

One or more embodiments of the presented joint adversarial generation model resemble a standard image formation process and can actually be regarded as an instance of differentiable renderers, which has been used for tackling many tasks including image restoration, 3D shape estimation, model-based reinforcement learning. Recently a 3D model-based differentiable renderer has been used for generating adversarial images. Although the disclosed generation model embodiments for joint spatial-pixel adversarial generation are presented without the aid of 3D models, this interesting connection may shed lights on possible directions.

F. Alternative Embodiments of Joint Pixel-Spatial (Joint-PS) Attack and Adversarial Training In sections D and E, embodiments of Joint Spatial-Pixel (Joint-SP) approach are presented. In one or more embodiments, the ordering of pixel and spatial attack may be switched to obtain alternative embodiments of a joint attack and training adversarial methodology, which may be denoted generally (for convenience) as Joint-PS. In this section, more details on the problem formulation and algorithm derivation for Joint-PS are presented.

1. Joint-PS Formula

In one or more embodiments, for the joint pixel-spatial case, the generation model for the adversarial image may be described as follows:

$$\tilde{x} = \mathcal{T}(x+\delta, \omega) \tag{14}$$

Figure 6:
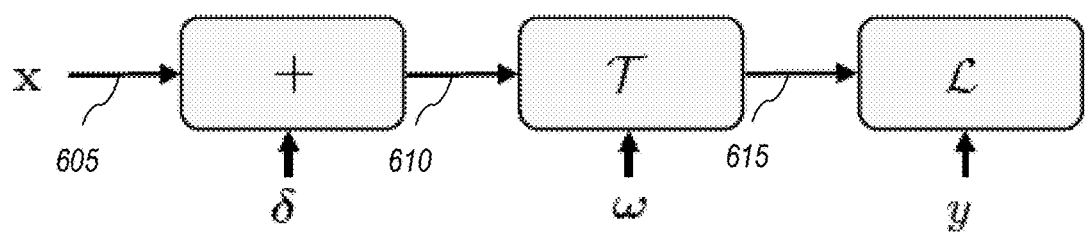
FIG. 6 depicts a computational graph for Joint Pixel-Spatial (Joint-PS) attack and training, according to embodiments of the present disclosure.

The corresponding computational graph is shown in FIG. 6. + corresponds to pixel-wise additive attacks to the input image x 605. $\mathcal{T}$ denotes the spatial transformation operator to perform spatial transformation for the pixel-wise attacked image 610. For generating joint adversarial attacks, the optimization is over $\omega$ and $\delta$, instead of over x directly. The optimized $\omega$ and $\delta$ are then used to generate the perturbed image 615.

Based on this, the adversarial image may be generated by optimizing over both $\delta$ and $\omega$ through a proper loss function $\mathcal{L}$. Given equation (14), the formulation for the joint adversarial training task for Joint-PS may be described as follows:

$$\min_{\theta} [\max_{\omega \in S_\omega, \delta \in S_\delta} \mathcal{L}(\mathcal{T}(x+\delta, \omega), y; \theta)] \tag{15}$$

In one or more embodiments, the feasible region $S_\delta$ may be defined as:

$$S_\delta = \{\delta | \delta + x \in B(x, \epsilon_x) \cap [-1,1]^n\} \tag{16}$$

Where $B(x, \epsilon_x) = \{z | \|z-x\|_\infty \leq \epsilon_x\}$, which essentially means the element z is in the ball when it is close to the transformed clean image $\mathcal{T}(x, \omega)$ in terms of $\ell_\infty$-norm. The adversarial example is generated by solving the inner problem of equation (15) optimizing over both $\omega$ and $\delta$. A practical methodology embodiment for this is presented in the sequel below.

2. Embodiments of Joint-PS Methodology

Figure 7:
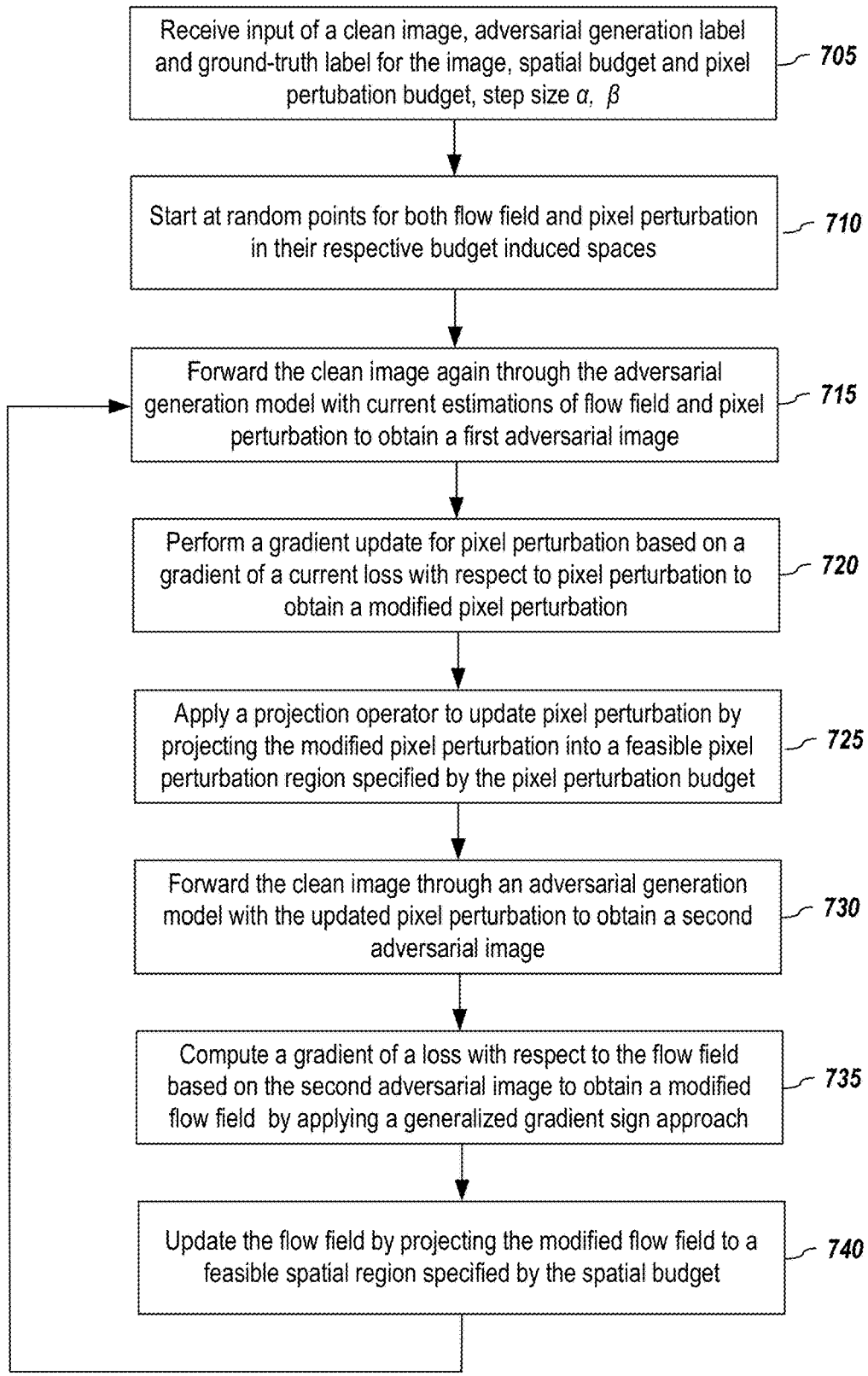
FIG. 7 depicts a double-pass methodology to handle interactions in Joint-PS attacks, according to embodiments of the present disclosure.

In one or more embodiments, to solve for the inner maximization problem of equation (15), a double-pass methodology is presented with detailed processes for joint-PS adversarial attack generation disclosed in FIG. 7 and summarized in Methodology 4.

A clean image x, ground-truth label y for the image x, spatial budget $\epsilon_\omega$, pixel perturbation budget $\epsilon_x$, spatial step size ca, and pixel step size $\beta$ are received (705) as input. Random points are used as starting points (710) for both flow field $\omega$ and pixel perturbation $\delta$ in their respective $\epsilon$-balls or budget induced spaces. In one or more embodiments, a determination process for an ascend/descend flag s is incorporated in the initiation step 710. The ascend/descend flag is set as −1 when the adversarial generation label y does not equal to the ground-truth label $y_{gt}$, and set as 1 otherwise. In the first pass, the clean image x is forwarded (715) through the adversarial generation model shown in equation (14) with current estimations of $\omega$ and $\delta$ to obtain a first adversarial image $\bar{x}$. Then the gradient of the loss with respect to $\delta$ is computed (720) based on $\bar{x}$ to obtain a modified pixel perturbation $\bar{\delta}$ based on at least the computed gradient $\nabla_\delta$. In one or more embodiments, a generalized gradient sign approach (Methodology 1) is applied, by applying the vector sign operator $\overrightarrow{\text{sign}}(\cdot)$ to the gradient $\nabla_\delta \mathcal{L}(\bar{x}, y; \theta)$, and then the vector sign applied gradient is used to take an ascend or descend step determined by the ascend/descend flag s and scaled by a steps size $\beta$ to obtain the modified pixel perturbation $\bar{\delta}$. A projection operator under a projected gradient descent (PGD) approach is then applied (725) to update $\delta$ by projecting the modified pixel perturbation $\bar{\delta}$ into a feasible region $S_\delta$ specified by the pixel perturbation budget $\epsilon_x$ and the ascend/descend flag s. In the second pass, the clean image is forwarded (730) again through the adversarial generation model with the updated $\delta$ to obtain a second adversarial image $\bar{x}'$ and perform (735) a gradient update for based on the gradient of the current loss (a function of at least the second adversarial image $\bar{x}'$) with respect to $\omega$ to obtain a modified flow field $\bar{\omega}$ by applying a generalized gradient sign approach (Methodology 1). In one or more embodiments, the vector sign operator $\overrightarrow{\text{sign}}(\cdot)$ to the gradient $\nabla_\omega \mathcal{L}(\bar{x}', y; \theta)$ is applied, and then the vector sign applied gradient is used to take an ascend or descend step determined by the ascend/descend flag s and scaled by a steps size $\alpha$ to obtain the modified flow field co. The flow field $\omega$ is updated (740) by projecting the modified flow field $\bar{\omega}$ to a feasible region $\delta_\omega$ specified by the spatial budget $\epsilon_\omega$. Processes 715~740 may be repeated for multiple (m) iterations to generate a final adversarial image. In one or more embodiments, the processes may be essentially viewed as a variant of the alternating minimization approach at instance level. The final adversarial image is generated as $\mathcal{T}(x, \omega^m)+\delta^m$, where m denotes number of steps.

---

Methodology 4 Joint-PS Attack via
Double-Pass Method Embodiments

---

Input: image x, adversarial generation label y,
ground-truth label $y_{gt}$, loss $\mathcal{L}$, step m,
budget $\epsilon_\omega$, $\epsilon_x$, step size $\alpha$, $\beta$
Initiate $\delta^0 \sim B(0, \epsilon_x)$, $\omega^0 \sim B(0, \epsilon_\omega)$
Determine the ascend/descend flag $$s = \begin{cases} -1, & y \neq y_{gt} \\ 1, & \text{else} \end{cases}$$

for t = 1 to m do
 $\bar{x} = \mathcal{T}(x + \delta^{t-1}, \omega^{t-1})$//first-pass
 $\bar{\delta} = \delta^{t-1} + \beta \cdot s \cdot \overrightarrow{\text{sign}}(\nabla_\delta \mathcal{L}(\bar{x}, y; \theta))$
 $\delta^t = \mathcal{P}_{S_\delta}(\bar{\delta})$
 $\bar{x}' = \mathcal{T}(x, \omega^{t-1}) + \delta^t$//second-pass
 $\bar{\omega} = \mathcal{T}(x, \omega^{t-1}) + \alpha \cdot s \cdot \overrightarrow{\text{sign}}(\nabla_\omega \mathcal{L}(\bar{x}', y; \theta))$
 $\omega^t = \mathcal{P}_{S_\omega}(\bar{\omega})$
end for
Output: adversarial image $\mathcal{T}(x + \delta^m, \omega^m)$.

G. Embodiments of Label Smooth

In one or more embodiments, a label adversarial technique for adversarial training is used in one or more embodiments of the present disclosure:

$$v_k = \nabla_{y_k} \mathcal{L}(x, y; \theta), v_M = \min_{k \neq c} v_k, \quad (17)$$

Where c denotes the ground-truth label index. In one or more embodiments, the following approach is used for label adversarial:

$$\bar{y}_k = \begin{cases} 1 - \epsilon_y, & \text{if } k = c \\ \dfrac{\epsilon_y}{C-1} \cdot \tau_k, & \text{otherwise} \end{cases} \quad (18)$$

where C denotes the total number of classes and $\tau_k$ denotes a multiplicative weight. When $\tau_k=1$, Equation (18) is the conventional label smoothing, which is a general technique for model regularization and has been used in adversarial training. In one or more embodiments, $\tau_k$ may also be adjusted according to the respective gradient with respect to $y_k$:

$$\tau_k = \frac{v_k - v_M + \xi}{\dfrac{\sum_{k \neq c} v_k}{n - 1} - v_M + \xi} \quad (19)$$

where $\xi$ is a small constant. $\epsilon_y$ in equation (18) denotes the amount of perturbation for label, and is typically set within the range as:

$$\epsilon_y \in \left( \frac{1}{1+\beta}, \frac{1}{1+\dfrac{\beta}{C-1}} \right) \quad (20)$$

In one or more embodiments, $\beta$ is set as 9.

H. Embodiments of Visualization

In one or more embodiments, a visualization of flow fields generated using a method embodiment, (e.g., Methodology 1), according to embodiments of the present disclosure, may be generated. The images may be enlarged by a factor (e.g., a factor of 10) using a nearest neighbor interpolation method. The flow vectors may also be are also scaled for visualization purpose.

In one or more embodiments, a flow field image may be created by using $\tilde{u}$, $$\frac{\tilde{u} + \tilde{v}}{2}$$

and $\tilde{v}$ as the R, G, B channels respectively. $\tilde{u}$ and $\tilde{v}$ denotes horizontal and vertical flow components scaled by the maximum component value:

$$\tilde{u} = \frac{u}{\max(|u, v|)}, \tilde{v} = \frac{v}{\max(|u, v|)}.$$

It is interesting to observe that, in one or more embodiments, while there is no explicit form of structured penalty applied over the flow field, the generated flow fields are not purely random and there are some structured patterns in the obtained flow fields in many cases.

I. Some Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

In this section, performance of embodiment of joint adversarial training are compared to state-of-the-art adversarial training on various datasets to test the effectiveness of the presented embodiments.

In one or more embodiments, the implementation of joint adversarial training is based on PyTorch. Extensive experiments are conducted in this section on various datasets including CIFAR10 (Krizhevsky, Learning multiple layers of features from tiny images. Technical report, 2009) and CIFAR100 (Krizhevsky, 2009). Comparisons with several state-of-the-art adversarial training methods are performed. A number of variants of the presented joint adversarial training approach are also compared as detailed in the sequel below.

Baselines.

All the methods are categorized to several categories according to the type of attack used during training. For each category there are one-step and multi-step variants apart from the standard training method:
  Natural: standard training using the original images.
  Pixel: pixel-based robust training methods. Multi-step variant corresponds to Madry method taking multiple PGD steps with random start. One-step version corresponds to Bilateral method using gradient descend with the most confusing targeted adversarial image generation and a variant of label smoothing.
  Spatial: approaches that uses the spatial attacks (Methodology 1) for model training.
  Joint: the presented approach that leverages joint spatial and pixel attacks robust training (Methodology 3).

Attacks for Evaluation.

In one or more experiment settings, for quantitative robustness evaluation, pixel budget is used as $\epsilon_x=8$ and spatial budget $\epsilon_\omega=0.3$. FGSM and multi-step PDGN are used as two representative pixel-based attack methods where N denotes the number of steps used. In one or more experimental settings, the developed Methodology 1 is used as a spatial attack method (denoted as "Spatial"), and the joint spatial-pixel attack method presented in Methodology 2 is used as a joint attack method (denoted as "Joint"). FGSM used a step size of 8. All other attacks take 20 steps, with pixel step size of 2 and spatial step size of 0.15. To generate strong attacks to for evaluating robustness, non-targeted attack is always used, and random start is used for all methods except for FGSM.

Implementation Details.

In one or more experimental settings, Wide ResNet (WRN-28-10) (Zagoruyko & Komodakis, Wide residual networks, British Machine Vision Conference, 2016) is used. For $\epsilon_\omega$, it is set to be 1% of image size, which corresponds to $\epsilon_\omega=0.3$ pixel for CIFAR10, and CIFAR100 datasets. The initial learning rate $\gamma$ is 0.1 for CIFAR. The number of epochs for all the multi-step methods is set as 100 with transition epochs as {60, 70} as it is empirically observed the performance of the trained model stabilized before 100 epochs. When incorporating spatial attacks, 300 epochs with transition epochs { 100, 150} is used as it is empirically observed it helps with the model performance, possibly due to the increased variations of data. The learning rate decay factor is 0.1. Madry method is used with multi-step PGD with the number of steps as 7 and step size as 2. For other multi-step methods, the number of steps is set as 5, the spatial step size $\alpha$ is set as 0.1; and the pixel step size $\beta$ is set as 2 for training. The transformation operator is implemented as a differentiable bilinear warping as in Jaderberg et al. (*Spatial transformer networks*, Advances in Neural Information Processing Systems, 2015).

1. CIFAR10

In one or more experimental settings, experiments were conducted on CIFAR10 (Krizhevsky, Learning multiple layers of features from tiny images. Technical report, 2009) and compare the performance of the proposed method with a number of baseline methods in this section. CIFAR10 is a popular dataset that is widely use in adversarial training literature with 10 classes, 5K training images per class and 10K test images. In one or more experimental settings, standard data augmentation is performed including random crops with 4 pixels of padding and random horizontal flips. The results are summarized in Table 1.

TABLE 1

Accuracy of different models under different attacks on CIFAR10. multi-step-Pixel corresponding to the Madry method and the one-step-Pixel corresponding to the Bilateral method*

| | | | Test Time Attack | | | |
|---|---|---|---|---|---|---|
| Models Acc.(%) | | Pristine | FGSM | PGD20 | Spatial | Joint |
| Natural | | 95.6 | 36.9 | 0.0 | 0.1 | 0.0 |
| multi step | Pixel | 85.7 | 54.9 | 44.9 | 45.6 | 11.6 |
| | Spatial | 91.0 | 57.0 | 18.7 | 70.8 | 13.4 |
| | Joint | 76.4 | 55.8 | 50.4 | 60.2 | 29.6 |
| one step | Pixel | 91.1 | 90.5 | 58.4 | 53.7 | 35.8 |
| | Spatial | 94.1 | 73.2 | 35.8 | 65.7 | 30.5 |
| | Joint | 92.1 | 88.7 | 64.0 | 68.0 | 53.1 |

Bilateral method*: Wang, J. Bilateral adversarial training: Towards fast training of more robust models against adversarial attacks. *CoRR*, abs/1811.10716, 2018

Several interesting observations have been noticed: (i) pixel-based robust models (multi-step i.e. Madry, one-step i.e. Bilateral) have certain level of robustness to the spatial attack, but are still less robust to spatial attacks compared with the spatial robust models. On the other hand, spatial-based robust models improves the robustness with respect to spatial attack significantly, and also improves the robustness with respect to pixel attacks at the same time, although it is still lacked compared with pixel robust models. This seems to suggest that the pixel and spatial attacks neither work in two totally independent spaces nor in a fully aligned space; instead, they seem to have a common subspace at least in part so that they can contribute to improving robustness with respect to each other. This contributes a complementary view to the one in Engstrom et al. that the two types of attacks (with a rigid spatial transformation) seems orthogonal to each other. (ii) the presented joint approach embodiments may further improve the model robustness compared with state-of-the-art methods, either under the multi-step or single-step framework. For example, when trained with one-step joint attacks (one-step-Joint), the model has a level of robustness on-par or even better compared to the models specifically trained to be resistant to a particular type of attacks (e.g., one-step-Pixel, one-step-Spatial). The improvement is more pronounced when considering evaluation with joint spatial-pixel attacks, indicating the effectiveness of the proposed method. In one or more embodiments, the one-step variant is used for the presented method in the following experiments.

Figure 8:
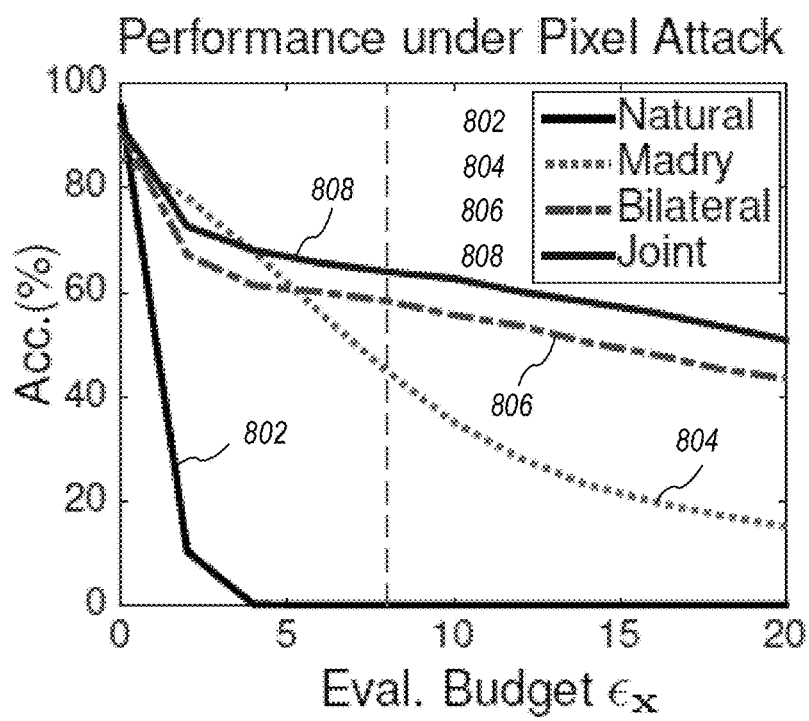
FIG. 8 graphically depicts robustness of different models at different pixel attack levels on CIFAR 10, according to embodiments of the present disclosure.
Figure 8:
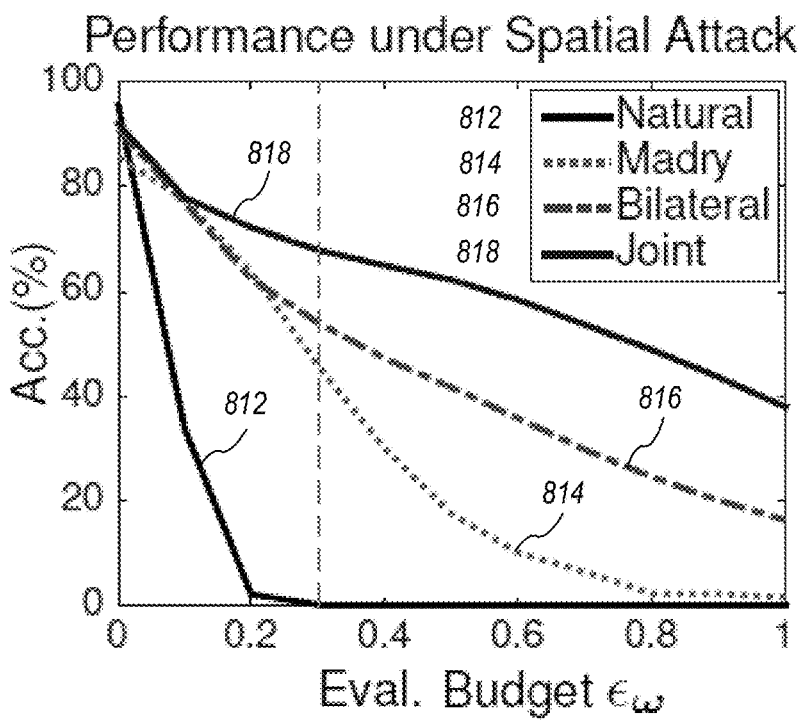

Different models are further compared at different attack levels (20 steps PFD) and the results are shown in FIG. 8. The top and bottom figures show the performance of different models under pixel attack and spatial attack respectively. The Natural model, Madry model, Bilateral model and the presented joint model are respectively denoted as 802/812, 804/814, 806/816, and 808/818 in FIG. 8. The vertical dashed lines represent the budgets used during training. It is observed that the present approach may improve its robustness with respect to both pixel and spatial attacks compared to the state-of-the-art methods. It is also observed that the Joint model trained with the presented approach outperforms other compared methods under both pixel and spatial attacks. Moreover, it is also interesting to note that although the model is trained under a fixed budget (marked with a dashed line), it generalizes to a range of attacks with varying budgets reasonably well.

2. Cascade, One-Pass and Double-Pass Comparison

In one or more experiments, several variants of integrating and solving spatial and pixel attacks are investigated for robust model training.

(i) Cascade is a baseline approach that simply cascades spatial and pixel attacks as two isolated modules.

(ii) One-pass is a baseline approach that uses a single forward-backward pass for updating both the spatial transformation and pixel additive values.

It may be seen from comparison results in Table 3 that neither Cascade nor One-pass cannot fully leverage the spatial and pixel attacks to improve model robustness. In fact, it is observed that the natural idea of naively cascading two types of attacks cannot show clear gain and sometimes compromise the robustness. Also, the straightforward one-pass approach does not work well, implying the importance of proper handling for the two types of attacks. Joint method with the double-pass algorithm may effectively improve model robustness and outperforms Cascade and One-pass methods by a large margin.

3. The Ordering of Spatial and Pixel Attacks

While the joint adversarial training approach embodiment in a spatial-pixel attack ordering is presented as in equation (12), other variations for joint adversarial training, such as approach in a pixel-spatial ordering, may also be applicable. In one or more embodiments, two variants of our presented joint adversarial training approach are disclosed and the impacts of ordering on the model robustness are investigated. Joint-SP and Joint-PS are used to denote the models trained following embodiments of the presented joint adversarial training approach with spatial-pixel and pixel-spatial ordering respectively. The results are shown in Table 4. It is observed that models trained under different attack orders might have slightly different performance under a particular attack but overall delivers comparable robustness performances. More details on Joint-PS approach are provided in Section F.

4. The Impact of Training Budgets

Models trained with different training budgets (the attack budget used in training) will have different performances. In this section, the impacts of training budgets are investigated, and the results are summarized in Table 2. The purpose of the experiments is to show that different training budgets do have different impacts on the final model robustness. It is observed that the performance of the presented embodiments are relatively stable with respect to the variations of budgets. The aim is not selecting the best performing model by grid-searching over the combinations of training budgets. In one or more embodiments, a training budget the same as the test budget is used as the default setting in the following experiments while the performance of model robustness may be further increased by tuning it.

TABLE 2

Evaluation accuracy of models trained with the Joint method under different training budgets ($\epsilon_X$, $\epsilon_\omega$) on CIFAR10

| Train | Pixel $\epsilon_X$ | 2 | | | 4 | | | 6 | | | 8 | | |
|---|---|---|---|---|---|---|---|---|---|---|---|---|---|
| Budgets | Spatial $\epsilon_\omega$ | 0.1 | 0.2 | 0.3 | 0.1 | 0.2 | 0.3 | 0.1 | 0.2 | 0.3 | 0.1 | 0.2 | 0.3 |
| Test time Attack | Pristine | 92.2 | 90.5 | 90.2 | 91.3 | 89.1 | 88.0 | 90.1 | 88.7 | 87.3 | 94.2 | 92.5 | 92.1 |
| | PDG20 | 68.7 | 65.9 | 61.6 | 65.4 | 61.4 | 57.8 | 64.5 | 59.2 | 57.5 | 65.2 | 62.3 | 64.0 |
| | PDG100 | 67.5 | 65.3 | 60.3 | 64.7 | 60.7 | 57.0 | 64.0 | 58.5 | 57.1 | 54.4 | 50.2 | 52.7 |
| | Spatial | 68.0 | 67.5 | 67.2 | 64.0 | 64.0 | 63.2 | 62.7 | 61.4 | 61.7 | 68.0 | 69.1 | 68.0 |
| | Joint | 61.53 | 62.8 | 57.3 | 59.4 | 57.1 | 53.6 | 58.8 | 54.0 | 53.5 | 46.4 | 46.7 | 53.1 |

TABLE 3

Comparison of different solutions integrating both spatial and pixel attacks on CIFAR10 ($\epsilon_x = 8$; $\epsilon_\omega = 0.3$)

| Models | Test Time Attack | | | | |
|---|---|---|---|---|---|
| Acc. (%) | Pristine | FGSM | PDG20 | Spatial | Joint |
| Cascade | 92.3 | 92.2 | 48.7 | 49.4 | 31.8 |
| One-pass | 91.8 | 95.5 | 32.6 | 44.9 | 23.8 |
| Joint | 92.1 | 88.7 | 64.0 | 68.0 | 53.1 |

TABLE 4

The impact of spatial-pixel attack ordering of presented method
embodiments on model robustness on CIFAR10 ($\varepsilon_x = 8$; $\varepsilon_\omega = 0.3$)

| Models | | Test Time Attack | | | |
|---|---|---|---|---|---|
| Acc. (%) | Pristine | FGSM | PGD20 | Spatial | Joint |
| Joint-SP | 92.1 | 64.0 | 68.0 | 53.1 | 48.5 |
| Joint-PS | 90.4 | 64.9 | 67.6 | 59.8 | 62.1 |

5. Embodiments of Black-Box Attack

In one or more embodiments, to further evaluate the robustness of the disclosed Joint approach with respect to black-box attacks (where the attackers have no knowledge on the model parameters, architectures etc.), experiments are conducted using undefended model and a jointly trained model in another training session for generating test time attacks. The results are presented in Table 5. As demonstrated by the results, the model trained with the Joint approach is robust against various of black-box attacks, verifying that a non-degenerate solution is learned.

TABLE 5

Accuracy of the Joint approach under black-box attack
on CIFAR10 dataset. Model used for black-box attacks (Attack
Gen. Model): "Undefended"-the model trained with clean images,
"Siamese" another model trained with the Joint approach.

| Black-box Attack | | FGSM | PDG20 | Spatial | Joint |
|---|---|---|---|---|---|
| Attack Gen. Model | Undefended | 88.7 | 90.7 | 90.4 | 90.5 |
| | Siamese | 88.7 | 82.4 | 85.2 | 79.8 |

6. CIFAR100

This section presents results against white-box attacks (where the attackers have full knowledge on the model parameters, architectures etc.) on CIFAR100 dataset, with 100 classes, 50K training images and 10K test images. The results are summarized in Table 6. As shown by the experimental results on CIFAR100, the disclosed approach embodiments may effectively increase the robustness of the model with respect to spatial attack and joint attack as expected. The joint approach helps boost the model robustness with respect to pixel attacks as well, which is well-aligned with the analysis on CIFAR10, that both forms of attacks have some complementary strength that may contribute to improve the model robustness with respect to each other.

TABLE 6

Accuracy of different models under different attacks on
CIFAR100 dataset ($\varepsilon_x = 8$; $\varepsilon_\omega = 0.3$)

| Models | | Test Time Attack | | | |
|---|---|---|---|---|---|
| Acc. (%) | Pristine | FGSM | PGD20 | Spatial | Joint |
| Natural | 79.0 | 10.0 | 0.0 | 0.0 | 0.0 |
| Madry | 59.9 | 28.5 | 22.6 | 24.6 | 4.8 |
| Bilateral | 72.6 | 60.8 | 25.4 | 23.6 | 14.5 |
| Joint | 68.6 | 63.2 | 28.8 | 28.6 | 26.6 |

J. Some Conclusions

Disclosed herein are embodiments of a joint adversarial training approach. Motivated by the goal of improving model robustness, embodiments of a spatial transformation-based attack method with explicit budget constraint are disclosed, and embodiments of an effective approach for joint adversarial attack generation and training incorporating both spatial and pixel attacks are presented. Extensive experiments on various datasets including CIFAR10 and CIFAR100 with comparison to state-of-the-art verified the efficacy of embodiments of the presented method. Embodiments of the presented joint attack or training approach may be applicable to more general transformation, by leveraging more advanced differentiable renderers or aided with 3D models. While the current and many other existing works focused on small scale datasets, it may be implemented to perform large scale joint adversarial training on ImageNet.

K. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

FIG. 10 depicts a simplified block diagram of a computing device/information handling system (or computing system) according to embodiments of the present disclosure. It will be understood that the functionalities shown for system 900 may operate to support various embodiments of a computing system—although it shall be understood that a computing system may be differently configured and include different components, including having fewer or more components as depicted in FIG. 9.

Figure 9:
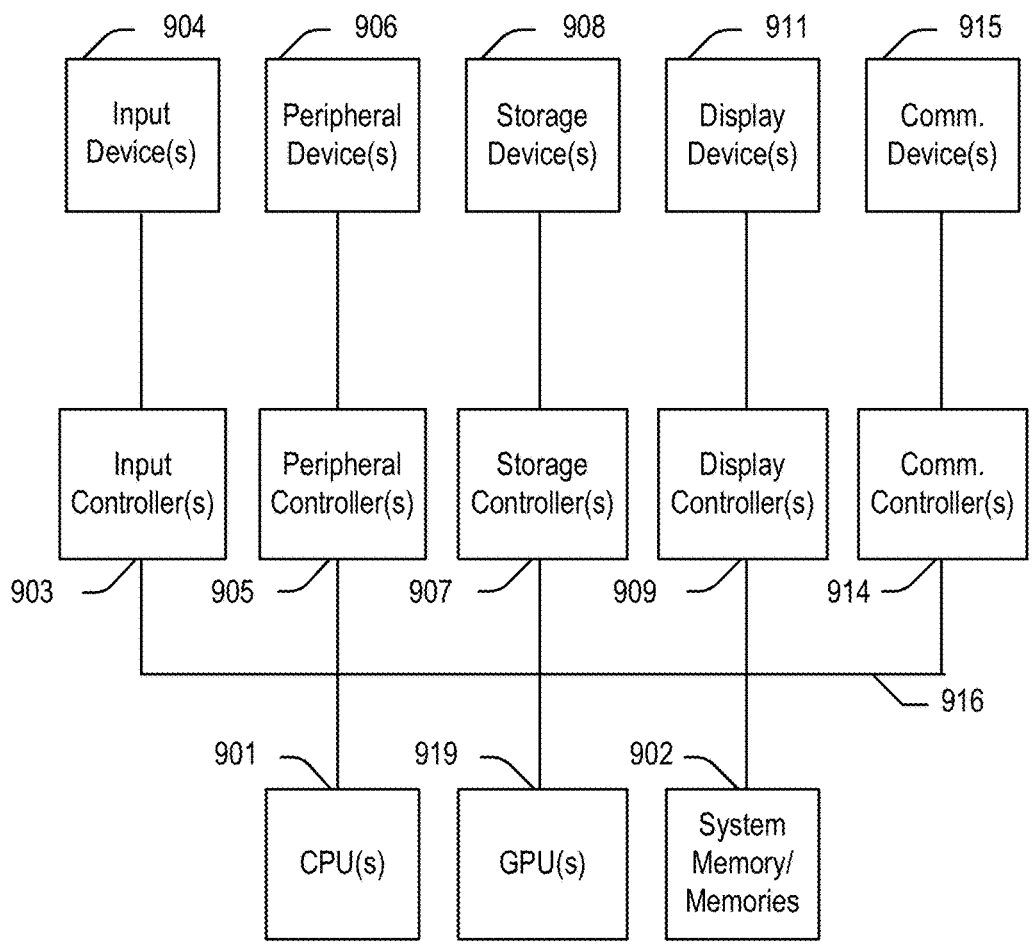
FIG. 9 depicts a simplified block diagram of a computing device/information handling system, in accordance with embodiments of the present document.

As illustrated in FIG. 9, the computing system 900 includes one or more central processing units (CPU) 901 that provides computing resources and controls the computer. CPU 901 may be implemented with a microprocessor or the like, and may also include one or more graphics processing units (GPU) 919 and/or a floating-point coprocessor for mathematical computations. System 900 may also include a system memory 902, which may be in the form of random-access memory (RAM), read-only memory (ROM), or both.

A number of controllers and peripheral devices may also be provided, as shown in FIG. 9. An input controller 903 represents an interface to various input device(s) 904, such as a keyboard, mouse, touchscreen, and/or stylus. The computing system 900 may also include a storage controller 907 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present invention. Storage device(s) 908 may also be used to store processed data or data to be processed in accordance with the invention. The system 900 may also include a display controller 909 for providing an interface to a display device 911, which may be a cathode ray tube (CRT), a thin film transistor (TFT) display, organic light-emitting diode, electroluminescent panel, plasma panel, or other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for adversarial image generation to train an image model using one or more processors to cause steps to be performed comprising:
  receiving an input image, a ground-truth label for the input image, a spatial attack budget, and a pixel perturbation budget;
  selecting random points for both flow field and pixel perturbation in their respective budget induced spaces;
  obtaining a first adversarial image for the input image using a current flow field and pixel perturbation, the current flow field and pixel perturbation are updatable and start from the selected random points;
  obtaining an adversarial-generation label by randomly sampling a non-ground-truth label;
  computing a gradient with respect to the flow field for a loss function comprising the first adversarial image, the adversarial-generation label, the ground-truth label and image model parameters;

obtaining a modified flow field based on at least the computed gradient with respect to the flow field;

projecting the modified flow field to a flow feasible region specified by the spatial attack budget to update the flow field;

obtaining a second adversarial image for the input image using the current pixel perturbation and the updated flow field;

computing a gradient with respect to pixel perturbation for a loss function comprising the second adversarial image, the adversarial-generation label and image model parameters;

obtaining a modified pixel perturbation based on at least the computed gradient with respect to pixel perturbation;

projecting the modified pixel perturbation to a pixel perturbation feasible region specified by the pixel perturbation budget to update the pixel perturbation; and generating an adversarial image based on the updated flow field and the updated pixel perturbation.

2. The computer-implemented method of claim 1 further comprising:

updating the flow field and the pixel perturbation for predetermined iterations to generate a final adversarial image.

3. The computer-implemented method of claim 2 wherein in updating the flow field, changes in the flow field are accumulated toward the input image instead of applied to adversarial images accumulatively.

4. The computer-implemented method of claim 1 wherein the first adversarial image is obtained by performing a spatial transformation for the input image using the current flow field to generate a spatial transformed image, and then applying a pixel-wise additive attack with the current pixel perturbation to the spatial transformed image.

5. The computer-implemented method of claim 4 wherein the generalized gradient sign normalizes the computed gradient while retaining original direction of the computed gradient.

6. The computer-implemented method of claim 1 wherein a generalized gradient sign is applied to the computed gradient with respect to the flow field of the loss function comprising the first adversarial image, the ground-truth label and image model parameters to obtain the modified flow field.

7. The computer-implemented method of claim 6 wherein the computed gradient with respect to the flow field vector applied with the generalized gradient sign is used for an ascend step scaled by a steps size in obtaining the modified flow field.

8. A computer-implemented method for adversarial image generation to train an image model using one or more processors to cause steps to be performed comprising:

receiving an input image, a ground-truth label for the input image, a spatial attack budget, and a pixel perturbation budget;

selecting random points for both flow field and pixel perturbation in their respective budget induced spaces;

obtaining a first adversarial image for the input image using the current pixel perturbation and flow field, the current flow field and pixel perturbation are updatable and start from the selected random points;

computing an adversarial-generation label by randomly sampling a non-ground-truth label;

computing a gradient with respect to pixel perturbation for a loss function comprising the first adversarial image, the adversarial-generation label and image model parameters;

obtaining a modified pixel perturbation based on at least the computed gradient with respect to pixel perturbation;

projecting the modified pixel perturbation to a pixel perturbation feasible region specified by the pixel perturbation budget to update the pixel perturbation;

obtaining a second adversarial image for the input image using a current flow field and the update pixel perturbation;

computing a gradient with respect to the flow field for a loss function comprising the second adversarial image, the adversarial-generation label and image model parameters;

obtaining a modified flow field based on at least the computed gradient with respect to the flow field;

projecting the modified flow field to a flow feasible region specified by the spatial attack budget to update the flow field; and generating an adversarial image based on the updated flow field and the updated pixel perturbation.

9. The computer-implemented method of claim 8 further comprising:

updating the flow field and the pixel perturbation for a predetermined iterations to generate a final adversarial image.

10. The computer-implemented method of claim 9 wherein in updating the flow field, changes in the flow field are accumulated toward the input image instead of applied to adversarial images accumulatively.

11. The computer-implemented method of claim 8 wherein the first adversarial image is obtained by applying a pixel-wise additive attack with the current pixel perturbation to the input image to generate a pixel-wise attacked image, and performing a spatial transformation for the pixel-wise attacked image using the current flow field.

12. The computer-implemented method of claim 8 wherein a generalized gradient sign is applied to the computed gradient with respect to the flow field of the loss function comprising the second adversarial image, the ground-truth label and image model parameters to obtain the modified flow field.

13. The computer-implemented method of claim 12 wherein the generalized gradient sign normalizes the computed gradient while retaining original direction of the computed gradient.

14. The computer-implemented method of claim 13 wherein the computed gradient with respect to the flow field vector applied with the generalized gradient sign is used for an ascend step scaled by a steps size in obtaining the modified flow field.

15. A computer-implemented method of joint adversarial training for an image model using one or more processors to cause steps to be performed comprising:

receiving a dataset comprising a plurality of input images, spatial attack budget and pixel perturbation budget, each image has a corresponding ground-truth label;

randomly sampling a batch comprising multiple input images and corresponding ground-truth labels from the dataset;

applying a joint adversarial attack incorporating both spatial and pixel attacks to each input image in the batch to generate an adversarial image batch comprising multiple adversarial images;

generating a smoothed ground-truth label for each input image of the batch;

for each adversarial image, obtaining a gradient of a loss function with respect to image model parameters based on at least the batch of perturbed images and smoothed ground-truth labels; and using a descent step based on the gradient for each adversarial image to update the image model parameters.

16. The computer-implemented method of claim 15 further comprising repeating the steps of randomly sampling; applying the joint adversarial attack, generating non ground-truth labels, obtaining the gradient of the loss function, and updating model parameters for a predetermined iterations.

17. The computer-implemented method of claim 15 wherein applying the joint adversarial attack incorporating both spatial and pixel attacks comprising:

performing a spatial transformation for each image using a flow field to generate a spatial transformed image; and applying a pixel-wise additive attack with a pixel perturbation to the spatial transformed image to generate an adversarial image.

18. The computer-implemented method of claim 15 wherein applying the joint adversarial attack incorporating both spatial and pixel attacks comprising:

applying a pixel-wise additive attack with a pixel perturbation to each image to generate a pixel-wise attacked image; and performing a spatial transformation for the pixel-wise attacked image using a flow field to generate an adversarial image.

19. The computer-implemented method of claim 15 wherein the smoothed ground-truth label for each image of the batch is generated replacing the ground-truth label via a label smoothing process.

20. The computer-implemented method of claim 15 wherein the descent step is the average of the gradients for each adversarial image of the batch scaled by a learning rate.

* * * * *